United States Patent
Kuznetsov et al.

(10) Patent No.: US 9,187,793 B2
(45) Date of Patent: Nov. 17, 2015

(54) PROCESS FOR MAKING LOW AND SPECIFIED HARDENABILITY STRUCTURAL STEEL

(76) Inventors: Anatoly Alexeevich Kuznetsov, Moscow (RU); Arkady Moissevich Peker, Odintsovo Moskovskaya (RU); Alexey Alexandrovich Kupriyanov, Moscow (RU); Sergey Ivanovich Nikitin, Moscow (RU); Ignor Semenovich Lerner, Vudurgh, NY (US)

( * ) Notice: Subject to any disclaimer, the term of this patent is extended or adjusted under 35 U.S.C. 154(b) by 98 days.

(21) Appl. No.: 13/881,434

(22) PCT Filed: Dec. 31, 2010

(86) PCT No.: PCT/RU2010/000817
§ 371 (c)(1),
(2), (4) Date: Apr. 25, 2013

(87) PCT Pub. No.: WO2012/057648
PCT Pub. Date: May 3, 2012

(65) Prior Publication Data
US 2013/0213184 A1    Aug. 22, 2013

(30) Foreign Application Priority Data

Oct. 26, 2010 (RU) .............................. 2010143501

(51) Int. Cl.
| | | |
|---|---|---|
| *C21C 7/076* | (2006.01) | |
| *C21C 5/28* | (2006.01) | |
| *C21C 5/52* | (2006.01) | |
| *C21C 5/56* | (2006.01) | |
| *C22C 33/04* | (2006.01) | |
| *C22C 38/04* | (2006.01) | |
| *C22C 38/06* | (2006.01) | |
| *C22C 38/02* | (2006.01) | |
| *C22C 38/42* | (2006.01) | |
| *C22C 38/50* | (2006.01) | |
| *C21C 7/00* | (2006.01) | |
| *C21C 7/06* | (2006.01) | |

(52) U.S. Cl.
CPC ................. *C21C 7/00* (2013.01); *C21C 5/5264* (2013.01); *C21C 5/562* (2013.01); *C21C 7/0006* (2013.01); *C21C 7/06* (2013.01); *C21C 7/076* (2013.01); *C22C 33/04* (2013.01); *C22C 38/02* (2013.01); *C22C 38/04* (2013.01); *C22C 38/06* (2013.01); *C22C 38/42* (2013.01); *C22C 38/50* (2013.01); *C21C 5/28* (2013.01); *C21C 7/0075* (2013.01); *C21C 2300/08* (2013.01); *Y02W 30/54* (2015.05)

(58) Field of Classification Search
CPC ........ C21C 5/28; C21C 5/5264; C21C 5/562; C21C 7/0075; C21C 7/0006; C21C 7/06; C21C 7/076; C22C 38/02; C22C 38/04; C22C 38/06; C22C 38/42; C22C 38/50; C22C 33/04
USPC ............ 75/567, 581, 560, 10.48, 10.5, 10.46, 75/10.63, 10.15
See application file for complete search history.

(56) References Cited

U.S. PATENT DOCUMENTS 2,559,016 A * 7/1951 Grossmann ..................... 374/53

FOREIGN PATENT DOCUMENTS

| JP | 58-130217 A * | 8/1983 | .............. C21C 7/072 |
|---|---|---|---|
| RU | 2164536 C1 * | 3/2001 | |

OTHER PUBLICATIONS

Machine translation for RU 2164536 C1 published Mar. 2001.*

* cited by examiner

*Primary Examiner* — George Wyszomierski
*Assistant Examiner* — Tima M McGuthry Banks
(74) *Attorney, Agent, or Firm* — John R. Benefiel

(57) ABSTRACT

A process for making desired low (LH) hardenability steels in an electric arc or, induction furnace, which is loaded with metal charge consisting of iron, carbon, alloy, scrap with a specified maximum content of manganese, silicon, chrome, nickel and copper, providing for the final content of each of them of not more than 0.1 weight % followed by carburization in a ladle or ladle furnace, the melt then deoxidized in the ladle or ladle furnace with aluminum (1.0-2.3 kg/t), titanium or vanadium in order to achieve the desired low hardenability DI. The invention makes it possible to obtain better mechanical properties and stable hardenability characterized by the particular desired DI.

4 Claims, No Drawings

PROCESS FOR MAKING LOW AND SPECIFIED HARDENABILITY STRUCTURAL STEEL

The invention refers to metallurgy, in particular to making low (LH) and specified (SH) hardenability steels in electric arc, induction furnaces or oxygen converters.

First developed in Russia, low (LH) and specified (SH) hardenability structural steels have acquired industrial application and are specifically designed for parts hardened using the through-surface hardening process.

The basic feature of LH steels is that their hardenability is substantially lower then that of carbon structural steels. Thus, if the typical carbon steel 45 (SAE 1045) hardenability estimated by the ideal diameter (DI) lies within the 20-38 mm range, in the $1^{st}$ generation typical low hardenability steel 58 (55 LH steel) per GOST 1050-88 (C—0.55-0.63%; Mn<0.2%; Si=0.1-3%; Cr, Ni, Cu<0.15% each) DI=10-16 mm, i.e. it has a narrower range.

SH steels differ from LH steels by higher values of DI—over 16 mm, while maintaining a narrower hardenability range.

Hardening of parts made from LH and SH steels using the through-surface hardening process (TSH) results in formation of a high-strength surface layer with the depth of 0.1 to 0.2 of the effective section diameter (thickness) with a martensite structure with HRC-60 ($\sigma_b$=2000-2800 MPa) hardness, while the more ductile core had HRC 30-40 ($\sigma_b$=1000-1500 Moa) hardness.

A significant feature of LH and SH steels is their lower tendency to the growth of hardenability itself and the size of the actual austenite grain when heated for through-surface hardening. Practical implementation of this property is substantially affected by smelting techniques, particularly deoxidation of the steel being smelted.

The present invention concerns a process for smelting of LH and SH steels in industrial melting units: electric arc, induction furnaces, or converters.

The closest method to the present invention is the "Process for production of low hardenability structural steel in an open-hearth furnace" described in Russian Patent 2164536 that includes loading of the charge in the form of steel scrap, iron carbon alloy, graphite, heating and melting of the charge, handling and flushing of slag during rimming and beginning of refining of the furnace bath with respect to composition and temperature, preliminary deoxidation of metal in the furnace and basic deoxidation in the ladle with aluminum and titanium during tapping of the melt.

The process makes it possible to produce higher grand $2^{nd}$ generation LH steels featuring a still narrower and more stable hardenability range (DI=10-14 and 11-15 mm depending on the permanent admixture content), particularly fine and stable austenite grain per GOST 5639 (ASTM) #10-11 when heated in a furnace, or #10-12 with induction heating.

The disadvantage of this process lies in a rather high steel hardenability level which does not allow through-surface hardening to be used for parts with the effective section diameter (thickness) of less than 16 (12) mm, rather high deviation in the hardened layer depth in finished products, along with occasional violation of the optimum—0.1-0.2 of the diameter (thickness). The process does not provide for smelting of SH steels.

The object of the present invention is:
Development of a process for production of the $3^{rd}$ generation LH steel with a finer, i.e., a "superfine" grain #11-14 per GOST 5639 (ASTM), lower hardenability level of DI<10 mm, substantially lower and stable deviation in hardenability—not more than 2.0 mm in the 6 mm<DI<15 mm (DI=6-8, 8-10, 11-13, 14-15 mm) range and higher mechanical properties;

It is a further object of the invention is to provide a process for production of a $3^{rd}$ generation SH steel with a finer "super fine" grain #11-14 per GOST 5639 (ASTM), substantially lower and stable deviation in hardenability—not more than 5.0 mm in the 16 mm<DI<50 mm range, not more than 10 MM in the 51 mm<DI<100 mm range and higher mechanical properties.

SUMMARY OF THE INVENTION

These objects recited are achieved by charging an electric arc, induction furnace or converter with iron carbon alloy, scrap with a specified content of manganese, silicon, chrome, nickel, copper, with the final content of each of them not exceeding 0.1 mass percent for LH steels, and 0.3 mass percent for SH steels, graphite, slag-forming components, melting of the charge to an extent when carbon content is not less than 1.0 weight % or 1.5 weight % in the converter, heating the furnace bath up to the temperature of beginning of refining, refining of the liquid melt with respect to carbon content prior to teeming of the heat in a ladle or ladle-furnace is done in an electric arc or induction furnace until the carbon content reaches an allowed upper limit; in the converter the upper limit is lower followed by carburization in the ladle. Slag content is adjusted during pure rimming and finishing by flushing some of the initial slag and with the periodic addition of slag-forming materials to the remaining slag to make sure the indicated permanent admixtures during tapping do not exceed 0.1 weight % of LH steels and 0.3 weight % for SH steels. After that, the molten metal is deoxidized in the ladle or ladle furnace with aluminum (1.0-2.5 kg/t), titanium and vanadium, with 0.3-0.5 of the entire aluminum amount it put on the ladle bottom and the rest—on the stream until at least 0.3 of the ladle or ladle furnace volume is filled. Titanium and vanadium area added after aluminum to make sure the aluminum content in the finished metal is 0.03-0.1 weight %, and titanium content is 0-0.4 weight %, vanadium—0-0.4 weight %. During smelting, after rimming and prior to heat tapping aluminum powder or calcium borate is added. In order to ensure the required hardenability level manganese, siliceous and other materials are added in strictly weighted quantities that help to maintain the required hardenability characterized by the ideal diameter DI in steel from 6 to 15 mm with the deviation of not more than 2 mm, from 16 to 50 mm with the deviation of not more 5 mm, from 51 to 100 mm with the deviation of not more than 10 mm.

According to the invention LH and SH steels are smelted from the charge in the form of iron carbon alloy and scrap with calculated proportions of Mn, Si, Cr, Ni, Cu, with tapping of not more than 0.1%. in the ladle. Similarly to the known process, the components containing of the above-mentioned permanent admixtures are not added in the furnace (converter) during smelting.

The specific feature of the process according to the invention is the particular way of carrying out deoxidation with basically achieves a particular desired low DI steel. The partial deoxidation in the furnace with aluminum is not done since prior to tapping aluminum reacts with nitrogen to form a coarse fraction of coagulated (aggregated) nitride (AlN) which is difficult to grind during subsequent technological operations.

Instead, deoxidation is performed in 3 steps:

1. Deoxidation of slag is accomplished by adding aluminum powder or calcium borate in the furnace prior to metal tapping;
2. Deoxidation of steel is implemented during furnace and converter tapping directly in the ladle using aluminum, titanium, vanadium and nitrogen;
3. Titanium, vanadium are added only after 100% addition of aluminum with at least 0.3 of the ladle volume filled, providing for the presence in the finished metal of specified amounts of: 0.3-1.2% carbon, 0.03-0.1% aluminum, 0-0.4% vanadium, 0-15% nitrogen, with carbon (carburizing agent)—in the form of cast iron or graphite to ensure specified chemical composition. After a 100% filing of the ladle with metal, aluminum slag in the form of aluminum powder or calcium borate is added.

Less expensive components, such as manganese and siliceous substances, as well as chrome, nickel are added in calculated amounts of 0-1.8%, tungsten—0-1.5%, molybdenum—0-0.5%, boron—0-0.007%, individually or in groups, in strictly weighed amounts, taking into account the residual contents of permanent admixtures, prior to tapping of the furnace and providing for the specified hardenability level, characterized by the LH steel ideal diameter (DI) from 6 to 15 mm with the deviation of not more than 2 mm, SH steel DI from 16 to 350 mm with the deviation of not more 5 mm, SH steel and DI from 51 to 100 mm with the deviation of not more than 10 mm, SH steel DI over 100 mm with the deviation of not more than 50 mm, are added to the steel to ensure the required hardenability, after which the steel-teeming ladle is subjected to soaking, stirring, lancing with nitrogen (argon) and teeming.

The following are examples of implementation of the process according to the invention:

EXAMPLE #1

A 2.5 t electric arc furnace was charged with 1.5 t steel scrap, 0.85 t conversion pig iron, 0.15 t limestone, 0.03 t bauxite and 0.02 t crushed electrodes. Carbon content on melting was 1.05%, metal temperature—1540° C. Duration of the steel pure rimming was 1 hour 20 minutes, bath temperature—1640° C., carbon drop rate—0.3%/hr at continuous renewal of slag, with aluminum powder or calcium borate added to it after rimming and prior to tapping.

During tapping, 0.5 kg/t of aluminum was supplied to the ladle bottom, and the rest of it (1.0 kg/t—onto the stream, until not more than 0.3 of the ladle volume was filled, after which 5 kg of 70% ferrotitanium was supplied onto the chute (stream), and as a result, without adding any other alloying agents and after holding, stirring with bars, lancing with nitrogen and teeming, the following LH steel composition was obtained weight %: C—0.58; Mn—0.08; Si—0.03, Dr—0.05; Ni—0.14; Cu—0.16; S—0.03; P—0.021; Ti—0.16; Al—0.05, rem.—iron.

The steel was used to make 8 mm thick flat springs. After through surface hardening (TSH), a cryptocrystalline martensite structure of a superfine actual austenite grain #12-13 as per standard scale was obtained in the hardened layer that was 1.4 MM deep (0.175 of the thickness, DI=7 mm).

EXAMPLE #2

A 500 k induction furnace was charged with 240 kg steel scrap, 250 kg conversion pig iron, the rest of the components being similar to those described above for the electric arc furnace in proportion to capacity. The smelting process, deoxidation with aluminum in the ladle, modifications with titanium were as per Example #1, after which ferromanganese and ferrosilicon were added to the ladle for the finished metal to contain 0.15-0.2% Mn and 0.15-2% Si.

LH steel with the following composition was obtained, weight %: C—0.81; Mn—0.20; Si—0.19; Cr—0.04; Ni—0.04; Cu—0.06; S—0.030; P—0.021; Ti—0.18; Al—0.05, Fe—rem. Steel was used to make 0.3 mm dia bearing rollers.

After TSH, a cryptocrystalline martensite structure of a superfine actual austenite grain #12 as per standard scale was obtained in the hardened layer that was 3.0 MM deep (0.10 of the diameter, DI=15 mm).

EXAMPLE #3

A converter was charged with 25% steel scrap and 75% liquid iron, and then lanced with oxygen in the amount of 2-3 M3/min-t, along with applying basic slag consistent of 50-70 kg/t of lime and 1-3 kg/t of fluorspar to obtain 1.5-2% carbon content. After removing high-manganese slag, lancing continued with addition of basic slag: 10-15 kg/t of lime and 3 kg/t of fluorspar. Lancing with oxygen is terminated when the weight fraction of each of permanent admixture Mn, Si, Ni, Cr is at least 0.1% (excluding chrome the content of which prior to the furnace tapping turned out to be 0.23%), carbon content corresponds to the upper limit of 0.67% and bath temperature is 1630-1660° C.

The invention claimed is:

1. A process for smelting low hardenability (LH) structural steel comprising, loading a charge in one of an electric arc, an induction furnace or a converter with iron carbon alloy, with a specified maximum content of manganese, silicon, chrome, nickel and copper, content of each of them of not more than 0.1 weight %, heating of the charge to a temperature corresponding to a beginning of refining, followed by carburization in a ladle or ladle furnace, a refining and a pure rimming period done by flushing a portion of slag from the furnace or converter and a recurrent addition of slag-forming materials to the remaining portion of the slag to keep a content of each of the manganese, silicon, chrome, nickel and copper in a melt during tapping to not more than 0.1 weight % deoxidizing the melt in the ladle or ladle furnace with aluminum, titanium and vanadium, with 0.3-0.5 weight % of a total amount of aluminum, titanium and vanadium added to the ladle or ladle furnace and a remaining amount until not less than 30% of the ladle or ladle furnace volume is filled, whereas titanium, vanadium and nitrogen are added after aluminum, making sure the metal in the ladle or ladle furnace contains 0.3-1.2 weight % carbon, 0.03-0.10 weight % aluminum, 0-0.4 weight % titanium, 0-0.4 weight % vanadium, 0 to 0.15 weight % nitrogen so as to achieve a steel of a particular Ideal Diameter (DI) value in the range of 6-15 mm after Through Surface Hardening (TSH) hardening.

2. The process according to claim 1 in which aluminum powder or calcium borate is added to the slag during heating after rimming and prior to tapping.

3. The process according to claim 1, in which aluminum powder or calcium borate is added to the slag after 100% filling of the ladle or ladle furnace.

4. The process according to claim 1, wherein the melt is lanced in the ladle or ladle-furnace with argon or nitrogen.

* * * * *